US008090350B2

(12) United States Patent
Choi et al.

(10) Patent No.: US 8,090,350 B2
(45) Date of Patent: Jan. 3, 2012

(54) RESYNCHRONIZATION METHOD FOR MOBILE COMMUNICATION TERMINAL

(75) Inventors: Hyoung-Kee Choi, Seoul (KR); Sung-Jae Cho, Gyeonggi-do (KR)

(73) Assignee: Sungkyunkwan University Foundation for Corporate Collaboration, Gyeonggi-do (KR)

( * ) Notice: Subject to any disclaimer, the term of this patent is extended or adjusted under 35 U.S.C. 154(b) by 965 days.

(21) Appl. No.: 12/047,503

(22) Filed: Mar. 13, 2008

(65) Prior Publication Data

US 2009/0029678 A1    Jan. 29, 2009

(30) Foreign Application Priority Data

Jul. 26, 2007 (KR) ................. 10-2007-0075148
Sep. 5, 2007 (KR) ................. 10-2007-0090148

(51) Int. Cl.
*H04M 1/66* (2006.01)

(52) U.S. Cl. ........................ 455/411; 705/67

(58) Field of Classification Search ........... None
See application file for complete search history.

(56) References Cited

U.S. PATENT DOCUMENTS

| 2004/0082313 A1 | 4/2004 | Broyles et al. |
| 2007/0178886 A1* | 8/2007 | Wang et al. ................ 455/411 |
| 2007/0192605 A1* | 8/2007 | Mizikovsky et al. ......... 713/170 |
| 2007/0257923 A1* | 11/2007 | Whitby-Strevens .......... 345/520 |

FOREIGN PATENT DOCUMENTS

| JP | 2004-007690 A | 1/2004 |
| JP | 2005-348414 A | 12/2005 |
| JP | 2007006003 | 1/2007 |
| KR | 102005004520 | 5/2005 |
| KR | 102006011779 | 11/2006 |

* cited by examiner

*Primary Examiner* — Marcos Batista
(74) *Attorney, Agent, or Firm* — Rabin & Berdo, P.C.

(57) ABSTRACT

Provided is a resynchronization method of a mobile communication terminal. The resynchronization method for a mobile communication terminal connected to a home location register and a mobile communication network, includes: extracting a communication network serial number corresponding to a terminal authentication request instruction received from a mobile communication network; comparing the communication network serial number with a terminal serial number stored in a predetermined memory; generating $n^{th}$ terminal synchronization failure information if the communication network serial number is smaller than the terminal serial number, where n is a nature number; and transmitting the generated $n^{th}$ terminal synchronization failure information to the home location register. The home location register ends a resynchronization procedure if the $n^{th}$ terminal synchronization failure information is smaller than previously stored $(n-1)^{th}$ communication network synchronization failure information.

9 Claims, 4 Drawing Sheets

RESYNCHRONIZATION METHOD FOR MOBILE COMMUNICATION TERMINAL

The present application claims priority under 35 U.S.C. 119 to Korean Patent Applications Nos. 10-2007-0075148 (filed on Jul. 26, 2007) and 10-2007-0090148 (filed on Sep. 5, 2007), which are hereby incorporated by reference in its entirety.

TECHNICAL FIELD

Embodiments relates to a mobile communication system and, more particularly, to a resynchronization method for a mobile communication terminal.

BACKGROUND

In case of a mobile communication system that needs to authenticate a mobile communication terminal, a mobile communication terminal generally transmits an authentication processing result as a response after receiving a paging message from a mobile communication network. As described above, the mobile communication terminal includes an authentication module for performing an authentication procedure, for example, a subscriber identity module (SIM), a universal subscriber identity module (USIM), and a user identity module (UIM).

The authentication procedure of a mobile communication system is a process that determines whether or not a subscriber information stored in a home location register (HLR) and/or a visitor location register (VLR), which are included in a mobile communication network, with predetermined information stored in a mobile communication terminal or not. Here, an authentication key is required in the authentication procedure. In general, a symmetric key method has been widely used. The symmetric key method authenticates a mobile communication terminal by comparing authentication keys stored in a home location register, a visitor location register, and a mobile communication terminal. Also, the authentication procedure may be performed for every outgoing calls or incoming calls of a subscriber, or may be selectively performed for some of outgoing calls or incoming calls. Hereinafter, an authentication method of a mobile communication terminal in a mobile communication system according to the related art will be described.

FIG. 1 is a schematic diagram illustrating a mobile communication system. FIG. 2 is a flowchart of a method for authenticating a mobile communication terminal of a mobile communication system according to the related art.

Referring to FIG. 1, the mobile communication system 100 includes a user terminal 110, a visitor location register 120, and a home location register 130. The user terminal 110, the visitor location register 120, and the home location register 130 are connected to each other through a wireless communication network. Here, the user terminal 110 may be any terminal capable of performing wireless communication.

The method for authenticating a terminal in a mobile communication system will be described with reference to FIGS. 1 and 2.

Referring to FIG. 2, the user terminal 110 transmits a location registration signal to the visitor location register 120 at step S210. Then, the visitor location register 120 determines whether an authentication vector (AV) corresponding to the user terminal 110 is stored in a provided memory or not at step S220. Here, the user terminal 110 may transmit a location registration signal to the visitor location register 120 through a repeater and/or a switch without sending the location registration signal directly.

At step S230, the visitor location register 120 requests the corresponding authentication vector to the home location register 130 if the visitor location register 120 cannot find the corresponding authentication vector from the provided memory At step S240, the home location register 130 generates a new authentication vector corresponding to the user terminal 110 and transmit the generated authentication vector the visitor location register 120.

At step S250, the visitor location register 130 requests terminal authentication to the user terminal 110 if the corresponding authentication vector is stored in the provided memory or if the home location register 130 transmits the corresponding authentication vector. Here, the visitor location register 130 transmits a random identification variable value (RAND, random challenge), algorithm information included in the authentication field, and/or a serial number (SQN) to the user terminal 110. At step S260, the user terminal 110 performs an authentication process using the various information received from the visitor location register 120 and transmits the result of the authentication process to the visitor location register 120 at step S270. Then, the visitor location register 120 verifies the received authentication result from the user terminal 110 and transmits the verifying result to the user terminal 110 at steps S280 and S290.

The mobile communication system 100 according to the related art authenticates the user terminal 110 as described above. Here, the user terminal 110 uses a serial number (SQN) included in an authentication field (AUTN) to determine whether or not resynchronization is performed during the authentication process. That is, the user terminal 110 compares a serial number (hereinafter, a terminal serial number) stored in a memory disposed in the terminal 110 with a serial number (hereinafter, a communication network serial number) stored in an authentication field (AUTN). If the communication network serial number is not lager than the terminal serial number, that is, the communication network serial number is smaller than the terminal serial number, the user terminal 110 requests resynchronization to the visitor location register 120. The resynchronization operation is for synchronizing the communication network serial number and the terminal serial number. When the user terminal 110 transmits the resynchronization request to the visitor location register 120, the resynchronization operation is performed by generating a new authentication vector at the home location register 130.

However, the terminal authentication method of the mobile communication system 100 according to the related art cannot prevent replay attack. If the replay attack is made, the home location register must generate a serial number, confirm validity, and generate an authentication vector. Therefore, the performance thereof may be dropped. Since an unnecessary authentication vector is transmitted to an attacker terminal if the replay attack is made, network resources may be wasted. Therefore, there has been a demand for developing a terminal authentication method that can effectively deal with the replay attack.

SUMMARY

Embodiments have been proposed in order to provide a resynchronization method of a mobile communication terminal for protecting the mobile communication terminal from a replay attack.

Embodiments have been also proposed in order to provide a resynchronization method of a mobile communication terminal for preventing performance of a mobile communication system from deteriorating and network resources from being wasted by a replay attack.

Embodiments relate to a resynchronization method for a mobile communication terminal connected to a home location register and a mobile communication network, including: extracting a communication network serial number corresponding to a terminal authentication request instruction received from a mobile communication network; comparing the communication network serial number with a terminal serial number stored in a predetermined memory; generating $n^{th}$ terminal synchronization failure information if the communication network serial number is smaller than the terminal serial number, where n is a nature number; and transmitting the generated $n^{th}$ terminal synchronization failure information to the home location register. In the resynchronization method, the home location register ends a resynchronization procedure if the $n^{th}$ terminal synchronization failure information is smaller than previously stored $(n-1)^{th}$ communication network synchronization failure information.

The generating $n^{th}$ terminal synchronization failure information may includes: reading $(n-1)^{th}$ terminal synchronization failure information previously stored in a predetermined memory; and generating the $n^{th}$ terminal synchronization failure information by adding 1 to the read $(n-1)^{th}$ terminal synchronization failure information.

The home location register may generate a $n^{th}$ communication network synchronization failure information and stored the $n^{th}$ communication network synchronization failure information in a predetermined memory if the $n^{th}$ terminal synchronization failure information larger than the $(n-1)^{th}$ communication network synchronization failure information, and The $n^{th}$ communication network synchronization failure information may be a value identical to the $n^{th}$ terminal synchronization failure information.

Embodiments also relate to a mobile communication terminal included in a mobile communication system, which is wirelessly connected through a home location register through a mobile communication network and performs a resynchronization procedure. The mobile communication terminal includes: a memory; an authentication unit for extracting a communication network serial number corresponding to a terminal authentication request instruction received from a mobile communication network, comparing the communication network serial number with a terminal serial number stored in the memory, and generating a $n^{th}$ terminal synchronization failure information if the communication network serial number is smaller than the terminal serial number where n is a natural number; and a terminal controller for transmitting the generated $n^{th}$ terminal synchronization failure information to a home location register. The home location register ends a resynchronization procedure if the $n^{th}$ terminal synchronization failure information is smaller than $(n-1)^{th}$ communication network synchronization failure information previously stored in a predetermined memory.

The authentication unit may read $(n-1)^{th}$ terminal synchronization failure information previously stored in the memory, and generates the $n^{th}$ terminal synchronization failure information by adding 1 to the read $(n-1)^{th}$ terminal synchronization failure information.

The home location register may generate $n^{th}$ communication network synchronization failure information if the $n^{th}$ terminal synchronization failure information is larger than the $(n-1)^{th}$ communication network synchronization failure information and stores the generated $n^{th}$ communication network synchronization failure information in a predetermined memory, and the $n^{th}$ communication network synchronization failure information may be a value identical to the $n^{th}$ terminal synchronization failure information.

Embodiments also relate to a computer readable recording medium readable by a mobile communication terminal and storing a program executing a resynchronization method for a mobile communication terminal connected to a home location register and a mobile communication network, the method including: extracting a communication network serial number corresponding to a terminal authentication request instruction received from a mobile communication network; comparing the communication network serial number with a terminal serial number stored in a predetermined memory; generating $n^{th}$ terminal synchronization failure information if the communication network serial number is smaller than the terminal serial number, where n is a nature number; and transmitting the generated $n^{th}$ terminal synchronization failure information to the home location register. The home location register ends a resynchronization procedure if the $n^{th}$ terminal synchronization failure information is smaller than previously stored $(n-1)^{th}$ communication network synchronization failure information.

DRAWINGS

DESCRIPTION

Hereinafter, embodiments of the present invention will be described in detail with reference to the accompanying drawings.

Figure 3:
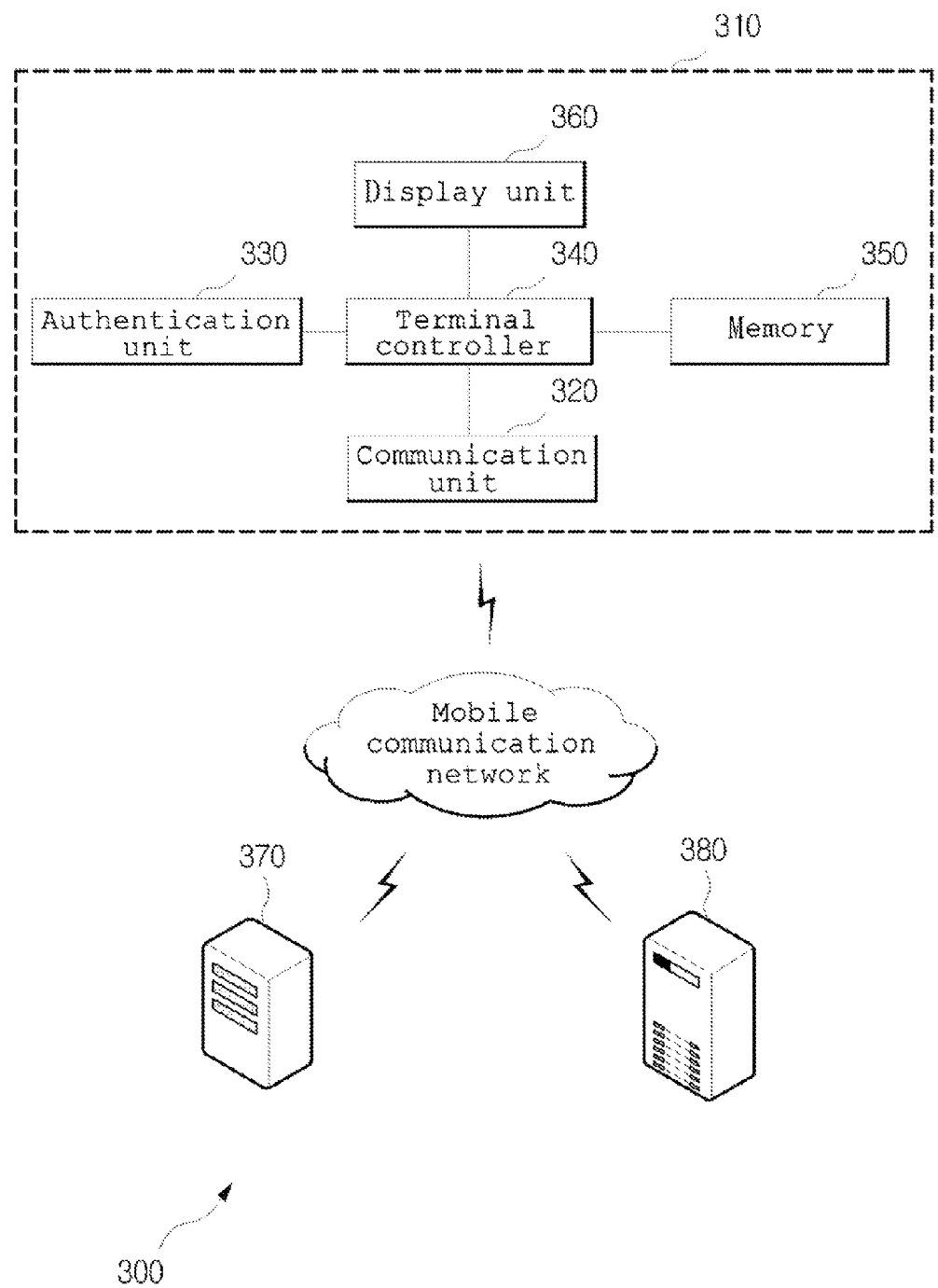
FIG. 3 is a schematic diagram illustrating a mobile communication system according to an embodiment.

FIG. 3 is a schematic diagram illustrating a mobile communication system according to an embodiment.

Referring to FIG. 3, the mobile communication system 300 may include a user terminal 310, a visitor location register (VLR) 370 and a home location register (HLR) 380. Here, the user terminal 310, the VLR 370, and/or the HLR 380 may be wirelessly connected to each other through a mobile communication network. Hereinafter, operations of constituent elements of the mobile communication system 300 according to the present embodiment will be described in detail.

The user terminal 310 performs voice communication and/or video communication to an opponent terminal (not shown) that is wirelessly connected with the user terminal through a mobile communication network. Here, the user terminal 310 may be any terminals capable of performing mobile communication through a mobile communication network. For example, the user terminal may be a mobile communication terminal and a personal digital assistant (PDA). As shown in FIG. 3, the user terminal 310 includes a communication unit 320, an authentication unit 330, a terminal controller 340, a memory 350, and a display unit 360. Although it is not shown in FIG. 3, the user terminal 310 may further includes a power source and a camera. Hereinafter, operations of constituent elements of the user terminal 310 will be described.

The communication unit 320 modulates various signals from the terminal controller 340 based on a predetermined scheme and transmits the modulated signals. Also, the communication unit 320 demodulates various signals received from a mobile communication network and outputs the demodulated signal to the terminal controller 340. Particularly, the communication unit 320 modulates a location registration signal input from the terminal controller 340 based on a predetermined scheme and transmits the modulated location registration signal to the visitor location register 370. Also, if the communication unit 320 receives a terminal authentication request instruction from the visitor location register 370, the communication unit 320 demodulates the received instruction based on a predetermined scheme and outputs the demodulated data to the visitor location register 270. Furthermore, the communication unit 320 modulates terminal synchronization failure information input from the terminal controller 340 based on a predetermined scheme and transmits the modulated data to the visitor location register 370.

The authentication unit 330 performs an authentication process based on a predetermined method if an authentication process instruction is input from the terminal controller 340. For example, the authentication unit 330 may generate an authentication key (AK) based on a predetermined method if the authentication process instruction is input from the terminal controller 340. A method for generating an authentication key in the authentication unit 330 is well-known to those skilled in the art. Therefore, detail description thereof is omitted.

The authentication unit 330 extracts a serial number from the generated authentication key and the visitor location register 370 using transmitted data. For example, the authentication unit 330 may extract a serial number (SQN) from an authentication field (AUTN) included in the visitor location register 370 using an authentication key, a random identification variable value (RAND, Random challenge) transmitted from the visitor locator register 370, and algorithm information included in an authentication field (AUTN). Hereinafter, the serial number is referred as a communication network serial number in order to discriminate it from a serial number stored in the user terminal 310. Here, the random identification variable value is a variable generated at the home location register 380. The random identification variable value is used for the authentication process.

Then, the authentication unit 330 compares the extracted communication network serial number with a serial number stored in the memory 350 or a memory of the authentication unit 330. Hereinafter, the serial number is referred as a terminal serial number to discriminate it from the communication network serial number. If the communication network serial number is larger than the terminal serial number, the authentication unit 330 performs an authentication procedure based on a method identical to a conventional authentication method. That is, the authentication unit 330 outputs an authentication result to the terminal controller 340 and the terminal controller 340 transmits the input authentication result to the visitor location register 370 through the communication unit 320.

On the contrary, if the communication network serial number is smaller than the terminal serial number, the authentication unit 330 generates a synchronization failure parameter (AUTS) in order to perform resynchronization. Here, the authentication unit 330 generates the terminal synchronization failure information and includes the generated terminal synchronization failure information into a synchronization failure parameter. Here, the terminal synchronization failure information is a serial number that may be synchronized with the communication network synchronization failure information stored in the home location register 380. For example, the authentication unit 330 may need to generate $n^{th}$ terminal synchronization failure information. In this case, the authentication unit 330 may generate the $n^{th}$ terminal synchronization failure information by adding 1 to the $(n-1)^{th}$ terminal synchronization failure information where n is a natural number. That is, the authentication unit 330 generates new terminal synchronization failure information by adding 1 to terminal synchronization failure information stored in the memory 350 or a memory of the authentication unit 330 and stores the new terminal synchronization failure information in the memory 350.

The home location register 380 uses the generated terminal synchronization failure information to detect a replay attack. It will be described in detail in later. Also, the authentication unit 330 is a constituent element for performing an authentication process as described above. Also, the authentication unit 330 may include one a subscriber identity module (SIM), a universal subscriber identity module (USIM), and a user identity module (UIM).

The terminal controller 340 controls overall operations of the user terminal 310. Particularly, the terminal controller 340 controls the communication unit 320 to transmit a location registration signal to a mobile communication network, particularly, the visitor location register 370, by outputting the location registration signal to the communication unit 320 at a predetermined time interval. The terminal controller 340 also transmits an authentication process instruction to the authentication unit 330 when the terminal controller 340 receives a terminal authentication request instruction from the communication unit 320. Here, the terminal authentication request instruction is a message transmitted from the visitor location register 370 and includes a random identification variable value (RAND, Random challenge), algorithm information included in an authentication field (AUTN), and/or a serial number (SQN). Also, the authentication process instruction is an instruction for controlling the authentication unit 330 to perform an authentication process. The authentication process instruction includes a random identification variable value (RAND, Random challenge), algorithm information included in an authentication field (AUTN), and/or a serial number (SQN), which are included in the terminal authentication request instruction.

Also, the terminal controller 340 receives an authentication result from the authentication unit 330 and transmits the received authentication result to a mobile communication network, particularly, to the visitor location register 370, through the communication unit 320. Particularly, if the terminal controller 340 receives a synchronization failure parameter having a terminal synchronization failure serial number from the authentication unit 330, the terminal controller 340 transmits the synchronization failure parameter to a mobile communication network, particularly, to the visitor location register 370.

The memory 350 is a storage space for storing an operating system and various software for driving the user terminal 310. Particularly, the memory 350 may store a terminal synchronization failure serial number and a terminal serial number. Various information for an authentication procedure such as a terminal synchronization failure serial number or a terminal serial number may be stored in a memory included in the authentication unit 330. Here, the memory 350 is a semiconductor memory, for example, a NOR semiconductor memory or a NAND semiconductor memory.

The display unit 360 is activated in response to control of the terminal controller 340 and displays various image signals. Here, the display unit 360 may includes a liquid crystal display (LCD) and a plasma display panel (PDP).

The visitor location register 370 is a register for storing information about a current location of a mobile communication terminal while roaming a service area in order to enable the user terminal 310 to perform mobile communication without spatial limitation. Particularly, if the visitor location register 370 receives a location registration signal from the user terminal 310, the visitor location register 370 determines whether an authentication vector of the user terminal 310 is stored in a predetermined memory or not. If the corresponding authentication vector is not stored in the predetermined memory, the visitor location register 370 requests the corresponding authentication vector of the user terminal 310 to the home location register 380. If the corresponding authentication vector is stored in the predetermined memory or the visitor location register 370 receives the corresponding authentication vector from the home location register 380, the visitor location register 370 transmits a terminal authentication request instruction to the user terminal 310.

When the visitor location register 370 receives a synchronization failure parameter (AUTS) having terminal synchronization failure information from the user terminal 310, the visitor location register 370 transmits the synchronization failure parameter (AUTS) to the home location register 380 for resynchronization.

The home location register 380 is a subscriber database for storing registration information and location information of the user terminal 310 and for performing an authentication procedure of the user terminal 310. Also, the home location register 380 performs transaction with the visitor location register 370 in order to update the subscribe information of the user terminal 310. Particularly, when the home location register 380 receives the synchronization failure parameter (AUTS) having the terminal synchronization failure information from the visitor location register 370, the home location register 380 extracts the terminal synchronization failure information from the received synchronization failure parameter. Then, the home location register 380 compares the extracted terminal synchronization failure information with stored communication network synchronization failure information. Here, the communication network synchronization failure information may be a serial number stored in a predetermined memory with being synchronized to terminal synchronization failure information when a corresponding user terminal 310 is initially registered to a mobile communication network.

Then, the home location register 380 performs a resynchronization procedure identical or similar to that according to the related art if the terminal synchronization failure information is larger than the communication network failure information. Here, the home location register 380 synchronizes the communication network failure information with terminal synchronization failure information and stores the synchronized information at a predetermined memory. For example, the home location register 380 compares received $n^{th}$ terminal synchronization failure information with stored $(n-1)^{th}$ communication network synchronization failure information. If the $n^{th}$ terminal synchronization failure information is larger than $(n-1)^{th}$ communication network synchronization failure information, the home location register 380 performs a predetermined procedure identical or similar to that according to the related art. Here, the home location register 380 generates $n^{th}$ communication network synchronization failure information by synchronizing it with the $n^{th}$ terminal synchronization failure information and stores the generated $n^{th}$ communication network synchronization failure at a predetermined memory.

For example, if the $n^{th}$ terminal synchronization failure information is information corresponding 6 and the $(n-1)^{th}$ communication network synchronization failure information is information corresponding 5, the home location register 380 converts the $n^{th}$ terminal synchronization failure information to information corresponding to 6 and stores the converted information in the predetermined memory.

On the contrary, if the terminal synchronization failure information is smaller than the communication synchronization failure information, the home location register 380 determines that the synchronization failure parameter is corresponding to a replay attack and ends the resynchronization procedure.

That is, the communication synchronization failure information stored in the home location register 380 may be a serial number synchronized with terminal synchronization failure information stored in the user terminal 310, which is stored when the user terminal 310 is initially subscribed at the mobile communication network. Since the user terminal 310 generally generates $n^{th}$ terminal synchronization failure information by adding 1 to $(n-1)^{th}$ terminal synchronization failure information and transmits the generated $n^{th}$ terminal synchronization failure information to the visitor location register 370, the terminal synchronization failure information received at the home location register 380, which is the $n^{th}$ terminal synchronization failure information, must be information larger than communication network synchronization failure information stored in the home location register 380, which is the $(n-1)^{th}$ communication network synchronization failure information as much as 1. Therefore, if the terminal synchronization failure information is smaller than the communication network synchronization failure information, it corresponds the replay attack or other error. Therefore, the home location register 380 can detect the replay attack or similar error through the above described operation.

Figure 4:
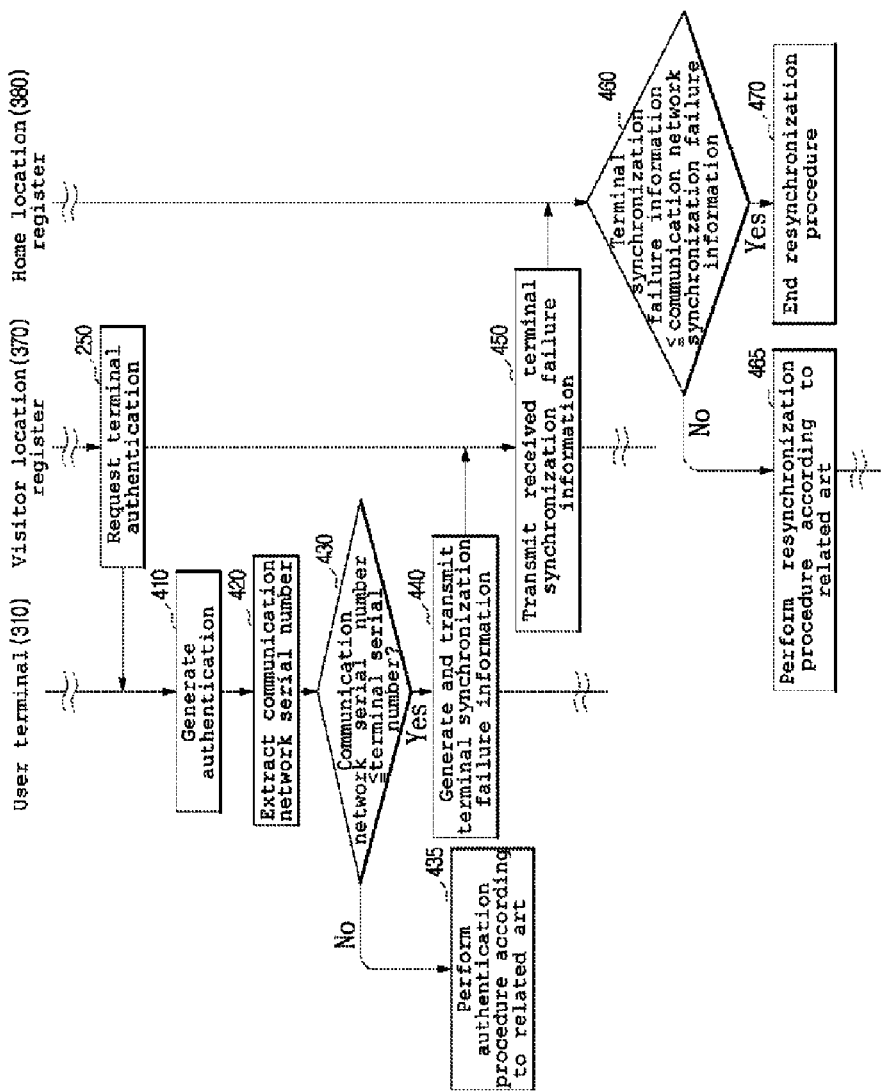
FIG. 4 is a flowchart illustrating a terminal authentication method for a mobile communication system according to embodiments.

FIG. 4 is a flowchart illustrating a terminal authentication method for a mobile communication system according to embodiments.

Figure 1:
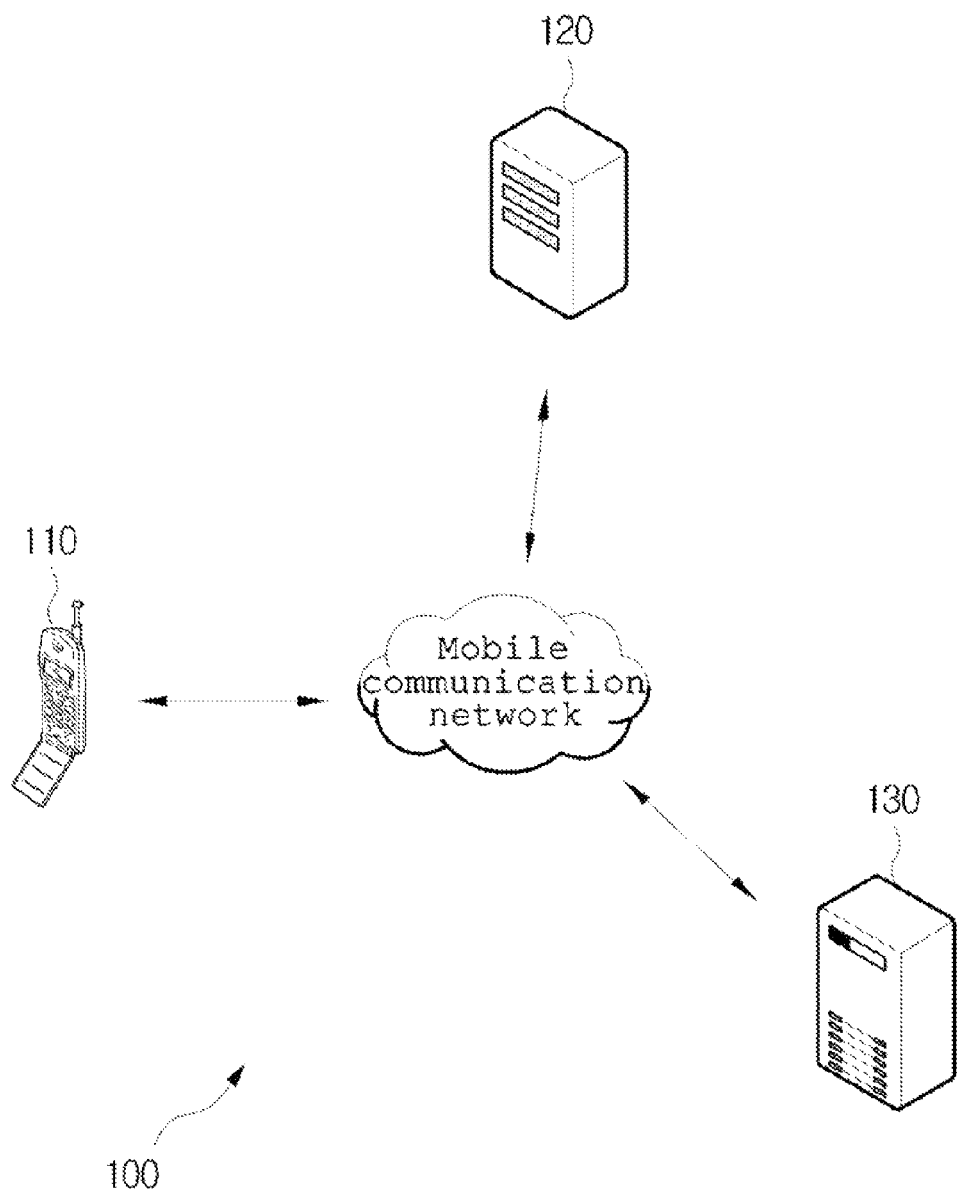
FIG. 1 shows a schematic flowchart illustrating the manufacturing method in accordance with embodiments.
Figure 2:
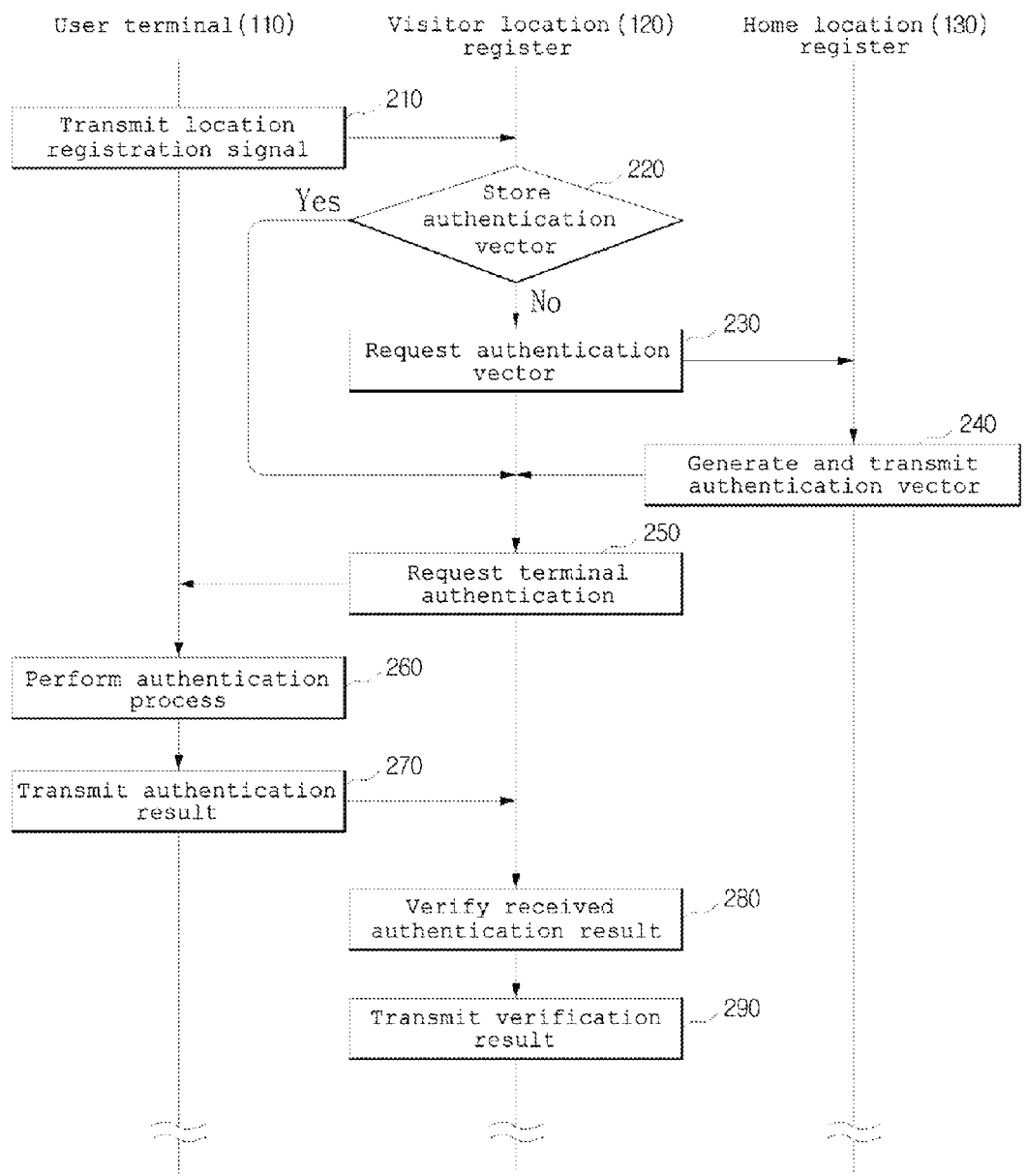
FIG. 2 is block diagram illustrating the embodiments in accordance with embodiments.

Hereinafter, a terminal authentication method for mobile communication system according to embodiments will be described with reference to FIG. 4. Although each of steps in the method may be steps performed in each of constituent elements including the user terminal 310, the visitor location register 370, and/or the home location register 380, the steps will be described to be performed each of the user terminal 310, the visitor location register 370, and/or the home location register 380 for convenience. Also, the steps of the terminal authentication method according to the embodiments may be performed after the steps S210 to S250 of the authentication method described with reference to FIG. 2. Therefore, detail descriptions of the steps 210 to 250, which are performed before step S410, are omitted.

At step S410, the user terminal 310 generates a new authentication key (AK) using a predetermined method if the user terminal 310 receives a terminal authentication request from the visitor location register 370, which is a terminal authentication request instruction.

At step S420, the user terminal 310 extracts a communication network serial number from the generated authentication key and the visitor location register 370 using transmitted data.

At step S430, the user terminal 310 compares the extracted communication network serial number with a terminal serial number stored in a predetermined memory. If the communication network serial number is larger than a terminal serial number, the user terminal 310 performs a procedure identical to an authentication procedure according to the related art at step S435. That is, if the communication network serial number is larger than a terminal serial number, the user terminal 310 performs the steps S270 to S290 shown in FIG. 2.

On the contrary, if the communication network serial number is smaller than a terminal serial number, the user terminal 310 generates a synchronization failure parameter (AUTS) for performing a resynchronization procedure and transmits the generated synchronization failure parameter (AUTS) to the visitor location register 370 at step S440. Here, the user terminal 310 can generate and transmit terminal synchronization failure information after putting it into a synchronization failure parameter. Here, the generated terminal synchronization failure information which is the $n^{th}$ terminal synchronization failure information is information generated by adding 1 to terminal synchronization failure information stored in a predetermined memory, which is the $(n-1)^{th}$ terminal synchronization information, as described above.

At step S450, the visitor location register 370 transmits the received synchronization failure parameter to the home location register 380. Here, the $n^{th}$ terminal synchronization failure information is also transmitted to the home location register 380 with the synchronization failure parameter.

At step S460, the home location register 380 compares the extracted $n^{th}$ terminal synchronization failure information with previously stored communication network failure information that is $(n-1)^{th}$ communication network synchronization failure information. Here, the communication network synchronization failure information may be a serial number stored in a predetermined memory, which is synchronized with terminal synchronization failure information when the user terminal 310 is initially registered at the mobile communication network, as described above.

If the $n^{th}$ terminal synchronization failure information is larger than the $(n-1)^{th}$ communication network synchronization failure information, the home location register 380 performs a resynchronization procedure identical or similar to that according to the related art at step S465. Here, the home register 380 synchronizes the $n^{th}$ communication network synchronization failure information with the $n^{th}$ terminal synchronization failure information and stores the synchronized information in a predetermined memory.

On the contrary, if the $n^{th}$ terminal synchronization failure information is smaller than the $(n-1)^{th}$ communication network synchronization failure information, the home location register 380 determines that the corresponding synchronization failure parameter corresponds to a replay attack and ends the resynchronization procedure at step S470.

As described above, the home location register 380 can determine errors such as a replay attack.

The resynchronization method according to the embodiments can protect a mobile communication terminal from the replay attack.

The resynchronization method according to the embodiments can prevent performance of a mobile communication system from deteriorating and network resources from being wasted by a replay attack.

It will be apparent to those skilled in the art that various modifications and variations can be made to embodiments without departing from the spirit or scope of the disclosed embodiments. Thus, it is intended that the present invention covers modifications and variations of this invention provided they come within the scope of the appended claims and their equivalents.

What is claimed is:

1. A resynchronization method for a mobile communication terminal connected to a home location register and a mobile communication network, the mobile communication terminal maintaining a terminal serial number and terminal synchronization failure information, the home location register maintaining communication network synchronization failure information that is of an equal value to the terminal synchronization failure information when the mobile communication terminal and the home location register are in synchronization, the method comprising:
   extracting a communication network serial number corresponding to a terminal authentication request instruction received from the mobile communication network;
   comparing the communication network serial number with the terminal serial number;
   updating the terminal synchronization failure information by increasing a value thereof, when the communication network serial number is not larger than the terminal serial number;
   transmitting the updated terminal synchronization failure information to the home location register; and
   ending a resynchronization procedure in the home location register when the updated terminal synchronization failure information is not larger than the communication network synchronization failure information.

2. The resynchronization method of claim 1, wherein said updating the terminal synchronization failure information includes increasing the value thereof by 1.

3. The resynchronization method of claim 1, further comprising, when the updated terminal synchronization failure information is larger than the communication network synchronization failure information, updating in the home location register the communication network synchronization failure information to be of a value equal to that of the updated terminal synchronization failure information, and storing the updated communication network synchronization failure information in a predetermined memory of the home location register.

4. A mobile communication terminal included in a mobile communication system and wirelessly connected to a home location register through a mobile communication network, the mobile communication terminal maintaining a terminal serial number and terminal synchronization failure information, the home location register maintaining communication network synchronization failure information that is of an equal value to the terminal synchronization failure information when the mobile communication terminal and the home location register are in synchronization, comprising:
   a memory on which the terminal serial number and the terminal synchronization failure information are stored;
   an authentication unit for
      extracting a communication network serial number corresponding to a terminal authentication request instruction received from the mobile communication network,
      comparing the communication network serial number with the terminal serial number stored in the memory, and
      updating the terminal synchronization failure information by increasing a value thereof, when the communication network serial number is not larger than the terminal serial number; and
   a terminal controller for transmitting the updated terminal synchronization failure information to a home location register, so that the home location register ends a resynchronization procedure when the updated terminal synchronization failure information is not larger than the communication network synchronization failure information.

5. The mobile communication terminal of claim 4, wherein said updating the terminal synchronization failure information includes increasing the value thereof by 1.

6. The mobile communication terminal of claim 4, wherein, when the updated terminal synchronization failure information is larger than the communication network synchronization failure information, the home location register updates the communication network synchronization failure information to be of a value equal to that of the updated terminal synchronization failure information.

7. A non-transitory computer readable recording medium readable by a mobile communication terminal and storing a program executing a resynchronization method for a mobile communication terminal connected to a home location register and a mobile communication network, the mobile communication terminal maintaining a terminal serial number and terminal synchronization failure information, the home location register maintaining communication network synchronization failure information that is of an equal value to the terminal synchronization failure information when the mobile communication terminal and the home location register are in synchronization, the method comprising:

extracting a communication network serial number corresponding to a terminal authentication request instruction received from the mobile communication network;

comparing the communication network serial number with the terminal serial number;

updating the terminal synchronization failure information by increasing a value thereof, when the communication network serial number is not larger than the terminal serial number; and transmitting the updated terminal synchronization failure information to the home location register, so that the home location register ends a resynchronization procedure when the updated terminal synchronization failure information is not larger than the communication network synchronization failure information.

8. The non-transitory computer readable recording medium of claim 7, wherein said updating the terminal synchronization failure information includes increasing the value thereof by 1.

9. The non-transitory computer readable recording medium of claim 7, wherein, when the updated terminal synchronization failure information is larger than the communication network synchronization failure information, the home location register updates the communication network synchronization failure information to be of a value equal to that of the updated terminal synchronization failure information, and stores the updated communication network synchronization failure information in a predetermined memory of the home location register.

* * * * *